(12) United States Patent
Divisek

(10) Patent No.: US 7,056,610 B2
(45) Date of Patent: Jun. 6, 2006

(54) ALKALINE DIRECT METHANOL FUEL CELL

(75) Inventor: Jiri Divisek, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 456 days.

(21) Appl. No.: 10/203,895

(22) PCT Filed: Feb. 3, 2001

(86) PCT No.: PCT/DE01/00442

§ 371 (c)(1),
(2), (4) Date: Aug. 13, 2002

(87) PCT Pub. No.: WO01/61776

PCT Pub. Date: Aug. 23, 2001

(65) Prior Publication Data

US 2003/0049509 A1    Mar. 13, 2003

(30) Foreign Application Priority Data

Feb. 19, 2000 (DE) .............................. 100 07 652

(51) Int. Cl.
 H01M 8/04  (2006.01)
 H01M 8/18  (2006.01)

(52) U.S. Cl. ................... 429/17; 429/19; 429/33; 429/34; 429/39

(58) Field of Classification Search ............... 429/33, 429/309, 13, 34, 30, 26, 43, 38, 32, 27; 205/629, 205/747, 688, 617; 204/533, 262, 258, 252; 417/50

See application file for complete search history.

(56) References Cited

FOREIGN PATENT DOCUMENTS

| DE | 195 31 852 | 12/1996 |
| JP | 63218165 | 9/1988 |
| JP | 11144745 | 5/1999 |
| WO | WO 97/50140 | 12/1997 |
| WO | WO 98/22989 | * 5/1998 |
| WO | WO 00/16422 | 3/2000 |

* cited by examiner

Primary Examiner—Michael Barr
Assistant Examiner—Robert Hodge
(74) Attorney, Agent, or Firm—Andrew Wilford

(57) ABSTRACT

The invention relates to a fuel cell, in particular a methanol fuel cell which has an anion-conductive membrane. The protons required for the formation of hydroxyl ions are supplied to the cathode chamber in the form of water. The water resulting from the reaction is produced at the anode. The method requires the use of alkaline media both in the anode chamber and in the cathode chamber.

5 Claims, 1 Drawing Sheet

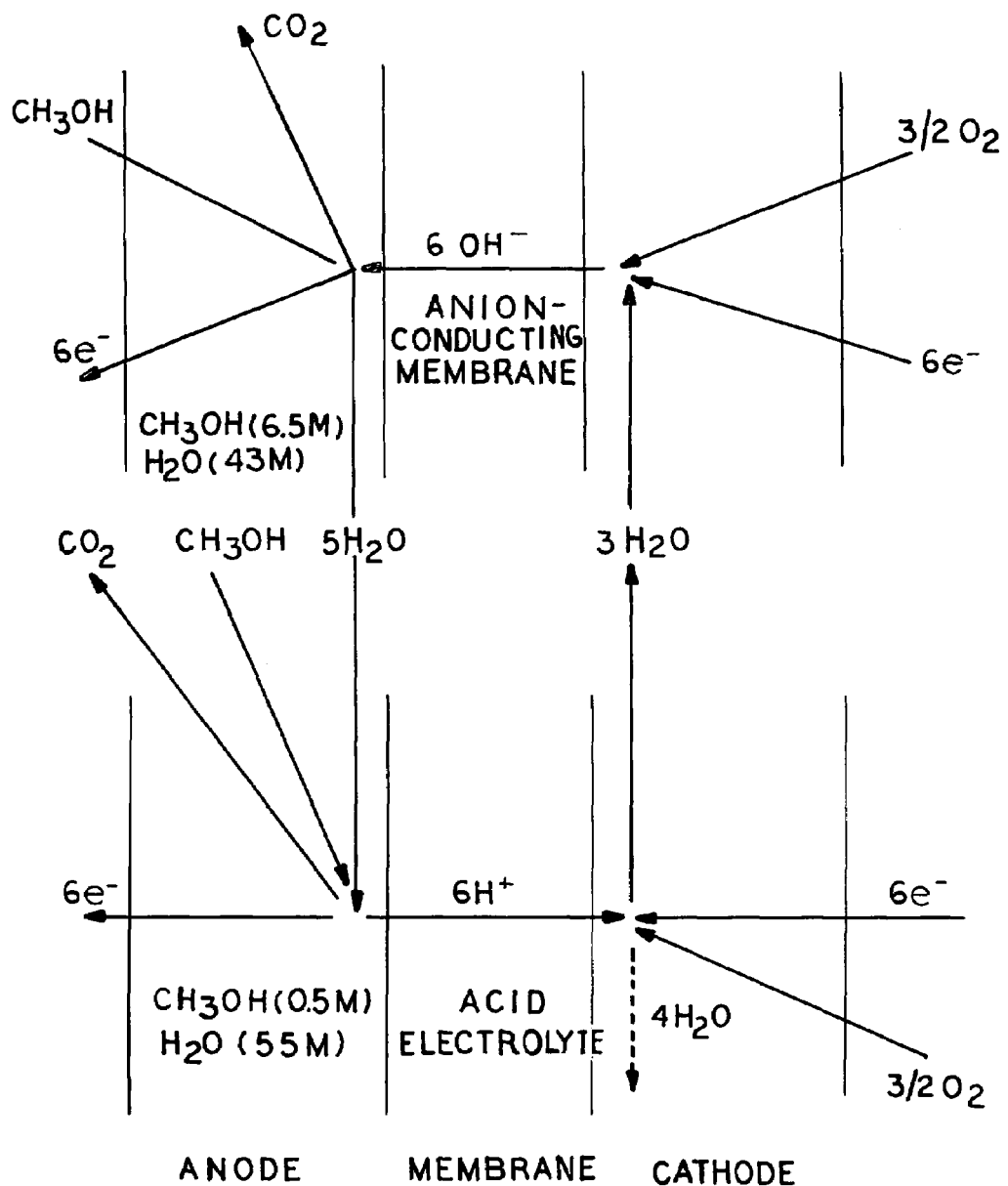

ALKALINE DIRECT METHANOL FUEL CELL

CROSS REFERENCE TO RELATED APPLICATIONS

This application is a national stage of PCT/DE01/00442 filed 3 Feb. 2001 and based upon German national application 100 07 652.1 of 19 Feb. 2000 under the International Convention.

FIELD OF THE INVENTION

The invention relates to a fuel cell, especially a methanol fuel cell, as well as to a method of operating this fuel cell.

BACKGROUND OF THE INVENTION

A fuel cell has a cathode, an electrolyte as well as an anode. The cathode is supplied with an oxidation medium, for example, air or oxygen, and the anode is supplied with a fuel, for example, hydrogen or methanol.

Various fuel cell types are known including for example the SOFC fuel cell (SOFC=Solid oxide fuel cell) from the publication DE 44 30 958 C1 and the PEM fuel cell (PEN=Proton exchange membrane) from the publication DE 195 31 852 C1.

The operating temperature of a PEM fuel cell is about 80° C. A PEM fuel cell can in principle be either acidic or alkaline depending upon the type of membrane or the working medium. Usually protons form at the anode of a PEM fuel cell with a proton conductor in the presence of the fuel by means of a catalyst. The protons traverse the electrolyte and combine to form water at the cathode side with oxygen stemming from the oxidation medium. Electrons are thereby liberated and electrical energy is generated. The drawback of a methanol fuel cell with a proton conductor is that the protons under the influence of the electric field also carry water molecules with them in their solvate shells. This electrophoresis effect is associated with a very high drag factor (number of entrained water molecules per proton). This means on the one hand that too much water is transported from the anode to the cathode which is disadvantageous for the thermal balance and on the other hand that methanol is also entrained so that there is a significant reduction in efficiency because of the formation in general of a mixed potential at the cathode.

Multiple fuel cells are electrically and mechanically connected together by connecting elements as a rule in order to produce greater electrical powers. These arrangements are known as fuel cell stacks.

As fuels, among others, methane or methanol can be used. The mentioned fuels are transformed by reformation or oxidation among others to hydrogen or hydrogen-rich gases.

There are two types of methanol fuel cells. The so-called indirect methanol fuel cells in which initially in a preliminary process step a hydrogen-rich gas mixture is produced and which is introduced into a polymer electrolyte fuel cell of the usual hydrogen type with anodic Pt/Ru-catalyst. This process variant is carried out in two stages: the gas production and the usual fuel cell.

A further significantly simpler variant which is significant from the process technology point of view is the so-called direct methanol fuel cell (DMFC) in which the methanol without intervening stages in the process technology is directly fed to the fuel cell. This cell has by comparison to the first, however, the drawback that the direct electrochemical methanol oxidation is kinetically a strongly limited process, which, in comparison to a hydrogen fuel cell is signified by greater losses in cell voltage. Even the best results of the DMFC cell at this time makes it hardly likely that these cells can compete in classical constructions with the indirect methanol fuel cells.

In this connection it may be noted that both the methanol permeation rate and the water vaporization enthalpy are too high in the cathode compartment of such cells. Furthermore, because of the unsatisfactory methanol oxidation rate it is necessary to maintain the operating temperature of the cell significantly above 100° C. There is, however, no appropriate electrolyte which can be function at temperatures above 120° C.

To be economical by comparison with the indirect methanol cell, the DMFC must have by comparison to the indirect cell at the same current density only about 100 mV smaller voltage (with MeOH permeation) or a voltage about 150 mV smaller without permeation. As simulation results have shown, the greater losses have their origins in anodic voltages resulting from the highly irreversible electrode kinetics. Consequently, even the catalytic coatings must be uneconomically high; because of the methanol permeation, the cathodic catalyst coating should be ten times higher than that which is the case in the hydrogen cell.

OBJECTS OF THE INVENTION

An object of the invention is to provide a fuel cell, especially a fuel cell stack, especially for the conversion of methanol which is effective and can avoid the aforementioned drawbacks.

Further it is an object of the invention to provide a method of operating a cell.

SUMMARY OF THE INVENTION

These objects are achieved with a fuel cell having an anion-conducting membrane and means for conducting water from the anode to the cathode compartment. The objects are also achieved with a fuel cell stack with these properties.

The methanol fuel cells within the scope of the claims encompass an anode compartment with an anode and a cathode compartment with a cathode as well as a membrane between the anode and a cathode which is anion conducting. An anion-conducting membrane is permeable to anions as, for example, hydroxide ions. A suitable membrane is, for example, a membrane having a basis of anion-conducting polymer electrolytes. In addition, the methanol fuel cells can encompass a means, that is a pathway, for conducting water out of the anode compartment to the cathode compartment. The means according to the invention for conducting water is thus not exclusively limited to water. This means can conduct also other liquids together with water; especially, these means can conduct a methanol/water mixture from the anode compartment to the cathode compartment of a fuel cell.

In an advantageous configuration of the fuel cell in accordance with the invention, the means for conducting water out of the anode compartment into the cathode compartment encompass a further fuel cell with an acid electrolyte which is suitable for separation of methanol.

Advantageously the fuel cell stack according to the invention has at least two methanol fuel cells with an anion-conducting membrane and a further fuel cell with an acid electrolyte.

With this fuel cell stack, methanol can be advantageously converted into electrical energy especially effectively and indeed in a process variant which is based on the use of an anion conducting polymer electrolyte.

The invention comprehends the use of an anion-conducting membrane which is permeable to the hydroxyl ions. It will be understood that the ions entrain no water or only a small amount of water so that the protons which serve for hydroxyl-ion formation must be supplied as water to the cathode whereby the product water is formed anodically. The use of an anion conductor shifts the chemistry of this process by contrast to that of the conventional DMFC and both as to the methanol oxidation and the oxygen reduction electrochemistry in an alkali media. This has however the following significant advantages:

The anodic methanol oxidation is carried out by means of a basic catalyzed dehydrogenation whereby the hydrogen formed is itself electrochemically active. It is thus to be expected that the overall catalyst will be more effective than in acidic medium.

The cathodic oxygen reduction in an alkali medium is not as strongly blocked as in an acid. Here as well a voltage recovery can be expected.

It is possible to eliminate the need for noble metals as catalysts. Raney nickel can be used as the electrode material for the methanol electrode in alkali medium. As for the oxygen electrode, for example, Ag, Co or Ni are conceivable as catalysts.

In an alkaline fuel cell, water is consumed for the formation of $OH^-$-ions at the cathode side. At the anode side water arises which must be removed from the cycle. Since a limiting current is hardly conceivable with complete conversion of the methanol used, there is always methanol present in the anodic residue which is not permissible. The non-recyclable water must thus be cleaned as an exhaust gas, i.e. must be freed from methanol which can be achieved for example by evaporation. However, the evaporation requires such an amount of energy that the entire process can be uneconomical.

In the context of the invention, a cascade purification scheme is proposed as is described below.

BRIEF DESCRIPTION OF THE DRAWING

FIG. 1 is a process diagram.

SPECIFIC DESCRIPTION

The invention as described in the drawing is based upon the following reaction equations:

Anode: $CH_3OH+6OH^-\rightarrow CO_2+5H_2O+6e^-$

Cathode: $3/2O_2+3H_2O+6e^-\rightarrow 6\ OH^-$

The product water is enriched in the anode circulation from which it must be removed. For that purpose a stack cascade scheme is provided which is comprised of alkaline cells which reduce the concentration of the supplied methanol with a high energy yield from a high concentration (in FIG. 1 as an example 6.5 M MeOH is assumed) to a concentration of 0.5 M. At the end of the cascade a conventional proton conducting DMFC cell is connected from which the product water is removed with a lower energy output and with a higher drag coefficient, from the anode circulation. A part of the product water is fed to the cathode compartment of the alkali cells for hydroxyl ion formation. In FIG. 1 as an example the following are assumed:

MeOH— concentration at cascade inlet: 6.5 M.

$H_2O$ concentration at cascade inlet: 43 M.

MeOH— depletion: down to 0.5 M, corresponding to an $H_2O$ enrichment to 55 M.

Drag factor at the protonic cells at 90° C.: 4.0.

The drag factor of 4.0 corresponds to the following DMFC cell reaction:

Anode: $CH_3OH+H_2O+24H_2O\rightarrow CO_2+6[H(H_2O)_4]^+ + 6e^-$

Cathode: $6[H(H_2O)_4]^+ + 3/2O_2+6e^-\rightarrow 3H_2O+24H_2O$

Water Discharge: $24H_2O(Anode)\rightarrow 24H_2O(cathode)$

From the above equations, there is a total of twenty-four moles of $H_2O$ discharged from the anode compartment per mole of $CH_3OH$ and 2 moles of $H_2O$ per mole of $CH_3$ are electrochemically formed. For the electrochemical balance 2 moles of $H_2O$ suffice, i.e. 24 moles of $H_2O$ correspond to the mass balance of the alkali cell. With these relationships the alkali cells utilize 92% of the MeOH introduced (with high energy yield) while 8% is used in the proton conducting cells. The stoichiometric water balance corresponds to:

Anode: $5H_2O+CH_3OH\rightarrow CO_2+6H^++6e^-+4H_2O$

Cathode: $3/2O_2+6H^++6e^-+4H_2O\rightarrow 7H_2O$

The reaction scheme satisfies the overall reaction equation for the combustion of methanol $CH_3OH+3/2O_2\rightarrow CO_2+2H_2O$ which thus characterizes a DMFC reaction process.

The invention claimed is:

1. A fuel cell system comprising:
   a first methanol fuel cell
   a first anode compartment with an anode and a methanol feeds,
   a first cathode compartment with a cathode, and
   an anion-conducting membrane between said first anode compartment and said first cathode compartment;
   a water pathway between said first anode compartment and said first cathode compartment for removing water formed at said anode and delivering water to said first cathode compartment; and
   a methanol separator alone said pathway for separating methanol from water formed at said anode before the separated water is delivered to said cathode compartment, said methanol separator being a second acid electrolyte fuel cell connected to said methanol fuel cell and having:
   a second anode compartment receiving water formed in the first anode compartment, and
   a second cathode compartment for delivering water to the first cathode compartment of said first fuel cell.

2. The fuel cell system defined in claim 1 wherein said acid electrolyte fuel cell is fueled by methanol.

3. The fuel cell system defined in claim 2 wherein the first fuel cell and the second fuel cell are interconnected into a fuel cell stack.

4. A method of operating a fuel cell system comprising:
   a first methanol fuel cell having:
   a first anode compartment with an anode and a methanol feeds,
   a first cathode compartment with a cathode,
   an anion-conducting membrane between said first anode compartment and said first cathode compartment;

a water pathway between said first anode compartment and said first cathode compartment for removing water formed at said anode and delivering water to said first cathode compartment, and a second, acid electrolyte fuel cell having:
   a second anode compartment, and
   a second cathode compartment, said method comprising the steps of:
(a) passing hydroxyl ions from said first cathode compartment to said first anode compartment through said anion-conducting membrane;
(b) feeding methanol to said first anode compartment as a fuel whereby water is produced in said first anode compartment;
(c) withdrawing methanol/water mixture from said first anode compartment and feeding the methanol/water mixture to said second anode compartment of fuel cell;
(d) feeding water formed in said second cathode compartment of said second fuel cell to the first cathode compartment of the first fuel cell; and
(e) supplying an oxidizer to the first and second cathode compartments of said first and second fuel cells.

5. The method defined in claim 4, further comprising the step of providing an acid electrolyte between the second anode compartment and the second cathode compartment of the further fuel cell.

* * * * *